(12) United States Patent
Smith et al.

(10) Patent No.: US 7,543,512 B2
(45) Date of Patent: Jun. 9, 2009

(54) BORE INSPECTION PROBE

(75) Inventors: Jarred A Smith, Huntersville, NC (US); Christopher M. Welsh, Livermore, CA (US); Trevor J Davis, Charlotte, NC (US)

(73) Assignee: General Electric Company, Schenectady, NY (US)

( * ) Notice: Subject to any disclaimer, the term of this patent is extended or adjusted under 35 U.S.C. 154(b) by 279 days.

(21) Appl. No.: 11/104,839

(22) Filed: Apr. 13, 2005

(65) Prior Publication Data

US 2006/0230846 A1 Oct. 19, 2006

(51) Int. Cl.
*G01M 19/001* (2006.01)
(52) U.S. Cl. .................................... 73/865.8
(58) Field of Classification Search ............. 73/152.54, 73/865.8, 622, 623; 324/220, 221; 376/249; 348/84, 85; 33/544, 544.1, 544.2, 544.3, 33/544.6, 542, 558.2, 558.4, 827
See application file for complete search history.

(56) References Cited

U.S. PATENT DOCUMENTS

| | | | |
|---|---|---|---|
| 2,854,758 A * | 10/1958 | Owen ..................... | 33/544.3 |
| 3,636,778 A | 1/1972 | Huffstetler | |
| 3,809,607 A * | 5/1974 | Murray et al. ............ | 376/249 |
| 3,862,578 A | 1/1975 | Schluter | |
| 4,050,384 A | 9/1977 | Chapman | |
| 4,131,018 A * | 12/1978 | Muller et al. ............ | 73/866.5 |
| 4,304,134 A | 12/1981 | Rouse et al. | |
| 4,581,927 A | 4/1986 | Johnson | |
| 4,581,938 A * | 4/1986 | Wentzell ................. | 73/623 |
| 4,820,982 A | 4/1989 | Aubert | |
| 4,843,896 A | 7/1989 | Napeloni et al. | |
| 4,876,506 A | 10/1989 | Brown et al. | |
| 5,025,215 A | 6/1991 | Pirl | |
| 5,028,381 A | 7/1991 | Dugue | |
| 5,105,881 A | 4/1992 | Thoms et al. | |
| 5,156,803 A | 10/1992 | Engding et al. | |
| 5,174,165 A | 12/1992 | Pirl | |
| 5,195,392 A | 3/1993 | Moore et al. | |
| 5,520,245 A | 5/1996 | Estes | |
| 5,565,633 A | 10/1996 | Wernicke | |
| 5,586,155 A | 12/1996 | Erbes et al. | |
| 5,760,306 A | 6/1998 | Wyatt, III et al. | |
| 5,787,137 A | 7/1998 | Nelson, III et al. | |
| 5,878,009 A | 3/1999 | Burrows et al. | |
| 5,982,839 A | 11/1999 | Hatley | |
| 6,076,407 A * | 6/2000 | Levesque et al. ......... | 73/623 |
| 6,169,776 B1 | 1/2001 | Collins | |
| 6,526,114 B2 | 2/2003 | Paillaman et al. | |

\* cited by examiner

*Primary Examiner*—Robert R Raevis
(74) *Attorney, Agent, or Firm*—Harness, Dickey & Pierce, PLC (57) ABSTRACT

A probe for inspecting a bore includes a housing dimensioned for insertion into the bore and a plurality of stabilization legs having a first end attached to the housing and a second end extendable from the housing. The stabilization legs are configured to contact the inner surface of the bore. A plurality of sensor arms is extendable from the housing and is rotatable relative to the stabilization legs. A motor provides for rotating the sensor arms relative to the stabilization legs.

29 Claims, 4 Drawing Sheets

BORE INSPECTION PROBE

FIELD OF THE INVENTION

The present invention relates to an apparatus for inspecting an interior of a bore and more specifically relates to a probe for inspecting the interior of a bore.

BACKGROUND OF THE INVENTION

Bores such as pipes or cylindrically shaped equipment are often constructed from welded segments that are subject to stress or wear. As such, there is often a need to inspect the interior surface of the bore during maintenance procedures for cracks and the integrity of a weld joint. For example, a reactor pressure vessel (RPV) of a boiling water reactor (BWR) typically has submerged bores that have interior welds that need to be inspected during maintenance routines. Hollow tubular jet pumps having internal bores are positioned within an annulus to provide the required reactor core water flow. The jet pumps include an upper portion known as the inlet mixer and a lower portion, known as the diffuser. The inlet mixer and the diffuser, due to their large size, are formed by welding a plurality of cylindrical and conical sections together. Specifically, respective ends of adjacent cylindrical sections are joined with a circumferential weld. During operation of the reactor, the circumferential weld joints may experience inter-granular stress corrosion cracking (IGSCC) and irradiation assisted stress corrosion cracking (IASCC) in weld heat affected zones which can diminish the structural integrity of the jet pump.

It is important to examine the welds of the jet pump inlet mixer and diffuser periodically to determine whether any cracking has occurred. While examinations in the annulus or region between a shroud and a pressure vessel wall can be performed, these examinations are likely to be only partial inspections due to access limitations in the annular region of the reactor. As such, the examination of the jet pump welds are often examined by an inspection tool positioned inside of the jet pump inlet mixer and jet pump diffuser. Such inspection tool performs ultrasonic and/or eddy current examinations of jet pump welds from inside the jet pump inlet mixer and diffuser in a nuclear reactor.

Typically, operational personnel located on a refuel bridge above the surface of the pool manipulate a tool delivery system that is connected to a jet pump inlet for insertion of an inspection probe. The long cylindrical inspection probe is inserted through the narrow opening of the jet pump inlet and is attached and vertically positioned within the jet pump by a guide cable. Once inside, the inspection probe is activated such that arms containing sensors are extended from the long cylindrical body of the inspection probe. The inspection probe sensing arms are rotated by a motor on the inspection probe to provide for a radial scan of the interior surfaces of the jet pump. The inspection probe often includes a stabilizing weight in an effort to stabilize the probe in the bore.

SUMMARY OF THE INVENTION

As recognized by the inventors hereof, current probes do not prevent the rotation of the non-sensing portions of the probe body and therefore the rotational position of the sensors cannot be tracked or determined. Also, such probes are typically only usable in a substantially vertical bore where the sensor arms themselves center the probe within the bore by making contact with the inner surface of the bore as they rotate. This is in part due to the suspended coupling of the inspection probe in the vertical bore of the jet pump and the inability of limiting the movement or of establishing a radial reference position within the bore. The inventors hereof have successfully developed an improved inspection probe for insertion and inspecting the interior of a bore that may or may not be a vertically positioned bore. By stabilizing a portion of the probe within the bore, the present invention can also provide for determining and tracking the rotation position of the sensing elements and therefore the sensor measurements can be correlated with a rotational position that enables the position of any identified defect.

According to one aspect of the invention, a probe for inspecting a bore includes a housing dimensioned for insertion into the bore and a plurality of stabilization legs having a first end attached to the housing and a second end extendable from the housing. The stabilization legs are configured to contact the inner surface of the bore. A plurality of sensor arms is extendable from the housing and is rotatable relative to the stabilization legs. A motor provides for rotating the sensor arms relative to the stabilization legs.

According to another aspect of the invention, a bore inspecting probe includes a housing dimensioned for insertion into the bore and having a first portion and a second portion. The probe includes at least one flexible joint coupling the first portion and the second portion and a spindle for rotatably coupling the first portion to the second portion. A plurality of stabilization legs have a first end attached to the first portion of the housing and a second end extendable from the housing. The stabilization legs are configured to contact the inner surface of the bore. A biasing element provides for retaining the stabilization legs within the housing and a stabilization leg actuator is configured for extending the second end of the stabilization legs from said housing. The probe also includes a plurality of sensor arms with each of the sensor arms having a first end attached to the second portion and a second end extendable from the second portion and having a sensor. At least one arm actuator provides for the extending the second end of the sensor arms from the housing to an extended sensing position. A motor provides for rotating the second portion relative to the first portion.

According to yet another aspect of the invention, a probe for inspecting an inner surface of a bore includes a housing dimensioned for insertion into the bore and having a first portion and a second portion and at least one flexible joint coupling the first portion and the second portion. A spindle provides for rotatably coupling the first portion to the second portion. A plurality of stabilization legs include a first end attached to the first portion of the housing and a second end extendable from the housing and each is configured to contact the inner surface of the bore. The probe also includes a stabilization leg actuator configured for extending the second end of the stabilization legs from said housing and a plurality of sensor arms with each of the sensor arms having a first end attached to the second portion and a second end extendable from the second portion. Each second end also includes a sensor. The probe has at least one arm actuator for extending the second end of the sensor arms from said housing to an extended sensing position. A motor provides for rotating the second portion relative to the first portion.

According to still another aspect of the invention, a probe for inspecting an inner surface of a bore that includes a housing dimensioned for insertion into the bore, with the housing having a first portion and a second portion. A plurality of stabilization legs is configured to contact the inner surface of the bore. Each stabilization leg has a first end attached to the housing and a second end extendable from the housing. The probe includes a means for extending each of the stabilization legs from a position within the housing to a position where the second end contacts the inner surface of the bore. The probe also includes a plurality of sensor arms with each of said sensor arms having a first end attached to the second portion and a second end extendable from the second portion and having a sensor. The probe further includes a means for extending each of the sensor arms from a position within the housing to a position positioning the sensor proximate to the inner surface of the bore and means for rotating the sensor arms relative to the stabilization legs.

Further aspects of the present invention will be in part apparent and in part pointed out below. It should be understood that various aspects of the invention may be implemented individually or in combination with one another. It should also be understood that the detailed description and drawings, while indicating certain exemplary embodiments of the invention, are intended for purposes of illustration only and should not be construed as limiting the scope of the invention.

BRIEF DESCRIPTION OF THE DRAWINGS

Like reference symbols indicate like elements or features throughout the drawings.

DETAILED DESCRIPTION OF EXEMPLARY EMBODIMENTS

The following description is merely exemplary in nature and is in no way intended to limit the invention, its applications, or uses. As noted, like reference symbols or numbers in the various figures indicate like elements or features throughout the drawings. As such, the description of the common elements, features, or parts in the previously presented figures are not repeated herein.

In one embodiment of the invention, a probe for inspecting an inner portion of a bore includes a housing dimensioned for insertion into the bore and a plurality of stabilization legs having a first end attached to the housing and a second end extendable from the housing. The stabilization legs are configured to contact the inner surface of the bore. A plurality of sensor arms is extendable from the housing and is rotatable relative to the stabilization legs. A motor provides for rotating the sensor arms relative to the stabilization legs.

Figure 1:
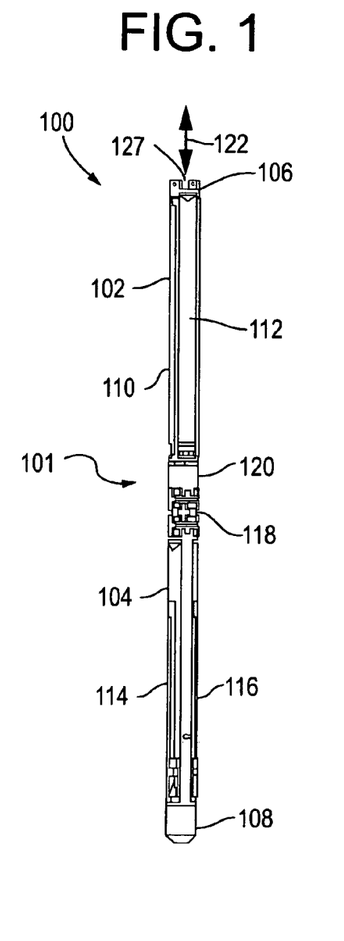
FIG. 1 is a perspective view of a bore probe in a collapsed position according to one exemplary embodiment of the invention.
Figure 2:
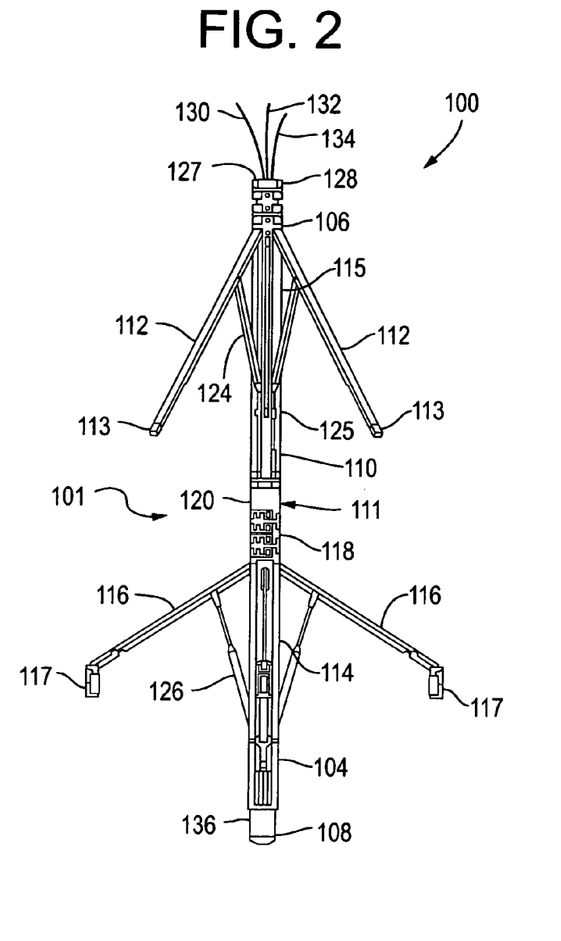
FIG. 2 is a perspective view of a bore probe in a radially extended position according to one exemplary embodiment of the invention.

One example of such a probe is illustrated in FIG. 1. As shown, probe 100 has housing 101 made up of a first segment or first housing portion 102 and a second segment or second housing portion 104, and a first end 106 and a second end 108. While the probe 100 and/or housing 101 can have many shapes and sizes, the probe 100 has in many embodiments a preferred long and cylindrical shape with an outer diameter less than the inner diameter of the bore to which the probe will be inserted and operated. The first segment 102 includes one or more chambers or cavities 110 that are dimensioned for capturing and retaining a plurality of stabilization legs 112. FIG. 1 illustrates stabilization legs 112 in a collapsed position within leg cavities 110 and FIG. 2 illustrates stabilization legs 112 in a radially extended position. As shown, each stabilization leg 112, in this exemplary embodiment, has one end rotatably attached to the first segment 102 and a second end that is radially extended from the body portion of the first segment 102. Similarly, the second segment 104 includes one or more chambers or cavities 114 that are dimensioned for capturing and retaining a plurality of sensor arms 116. FIG. 1 illustrates sensor arms 116 in a collapsed position within sensor arm cavities 114 and FIG. 2 illustrates sensor arms 116 in a radially extended position. As shown, each sensor arm 116, in this exemplary embodiment, has one end rotatably attached to the second segment 104 and a second end that is radially extended from the body portion of the second segment 104. While FIGS. 1 and 2 illustrated the first segment 102 as a top segment and the second segment 104 as a bottom segment, this position can be reversed in other embodiments of the invention.

The first segment 102 is flexibly coupled to the second segment 104 by a flexible joint or coupler 118 that provides flex between the two segments and thereby enables the insertion of probe 100 into a bore having limited access. Additionally, a rotary coupler 120 provides for the rotation of the second segment 104 relative to the first segment 102. The rotary coupler 120 includes a motor (not shown) and can include other components including, by way of example, a bearing, a gear, a spindle, and an axle (not shown).

Typically, the probe 100 is supported or engaged for operation via a support cable (not shown) attached to the first end 106. Additionally, one or more operational lines 122, as will be discussed in greater detail below, can enter the probe through a cavity 127 or port in the first end 106.

Once the probe 100 is placed into a bore, the stabilization legs 112 are extended radially from the leg cavity 110 as shown in FIG. 2. The exemplary probe 100 can have each stabilization leg 112 radially extended by one or more supports or guides 124 and can have a friction element 113 on an end. These guides 124 can extend the stabilization legs 112 by one or more actuators (not shown). The friction elements 113 can be configured to contact and engage the inner surface or wall of a bore with some degree of friction. The friction elements 113 can be composed of any type of material, such as a rubber, or may be a serrated or other feature of the end of the stabilization leg 112 that can increase the frictional contact of the stabilization leg 112 with the bore's inner surface.

Additionally, one or more of the guides 124 or the actuators can be biased by a biasing element 115, such as a spring, to position the stabilization legs 112 in a normally open or normally closed position. In one preferred embodiment, one or more springs (not shown) can be configured to bias the guides 124 to normally collapse the stabilization legs 112 into the leg cavities 110. An actuator 125, such as an air or hydraulic cylinder, can exert a force counter to the normal bias of the biasing element 115 to move the guides 124 upward and cantilevering one end of each guide 124 outward. In such a manner, an unattached end of each stabilization leg 112, which can include the friction element 113, is radially extended to contact the inner surface of the surrounding bore. The amount of outward force exerted by the actuator 125 on the stabilization legs 112 and the friction elements 113 can be adjusted and monitored to provide the proper stability of the stabilization legs 112 in relation to the bore.

Some embodiments can also provide for a substantially similar extension or outward force on each stabilization leg 112, which can result in the plurality of legs (shown by way of example to be three legs) centering the probe 100 within the bore. Additionally, by having the stabilization legs 112 biased to a collapsed position, the probe 100 can be more easily extracted from a bore if a failure of the probe 100 occurs, such as the loss or outage of an operational line or signal.

The sensor arms 116 also extend radially from the arm cavity 114 by one or more sensor arm actuators 126. In the exemplary embodiment of FIG. 2, each sensor arm 116 having a sensor 117 on one end can also include one arm actuator 126 associated with the sensor arm 116 to position the sensor arm 116 in the desired position. Typically, the sensor arms 116 will be in a collapsed position within the arm cavities 114 as a default. As such, one or more biasing elements (not shown) can be used to collapse each sensor arm 116. Each arm actuator 126 when receiving the necessary actuating input or signal extends at least a portion of the associated sensor arm 116 from the arm cavity 114 outward as shown in FIG. 2. The amount of extension of the sensor arms 116 can be adjusted during operation based on the particular requirements. For example, the sensor arms 116 can be extended to contact the inner surface of the bore walls if the sensor 117 or sensing operation requires contact. If not, the sensor arms 116 can be extended only partially between the sensor body and the bore walls. The present design enables this partial placement since the probe can be centered and stabilized in the bore by the stabilization legs 112 that are separate from the sensor arms 116.

As shown, one end of the sensor arm 116 includes a sensor 117. The sensor 117 can be any type of sensor and there may be more than one sensor per sensor arm 116. Additionally, the sensor 117 can be attached to the end of the sensor arm 116 by a gimbal or joint and can include a biasing member. The sensor gimbal can provide for alignment of the sensor 117 with an inner surface of the bore. The biasing element can retain the sensor 117 or sensing tip in a plane with the sensor arm 116 during normal operation to thereby enable the sensing tip to also collapse within the sensor cavity 114. The gimbal and biasing element can still enable the sensor to adjust or align with the sensing surface of the bore as required when the sensor arms 116 are in the extended position.

A motor 111 can be provided in either the first segment 102 or the second segment 104 and provide a rotary force for rotating the sensor arms 116 relative to the stabilization legs 112. As shown in FIG. 2, by way of example, the motor 111 can be included within the lower portion of the first segment 102 adjacent to and possibly within the rotary coupler 120. It should be understood to those skilled in the art, however, that other positions and placements of the motor 111 are possible and still are within the scope of this invention.

FIG. 2 also illustrates a flexible coupling 128 proximate to the first end 106 to provide a flexible link to an external support cable (not shown). Also operational lines 122, such as 130 (electrical power line), 132 (actuator line), and 134 (sensor line) provide operational connectivity to external control or operational systems (not shown). These can include an electrical power line 130 for one or more probe systems including operating the motor 111, an actuator line 132 for providing air or other hydraulic fluid for operation of one or more leg actuator 125 and arm actuators 126, and a sensor line 134 for communication of a sensed signal or sensor characteristics from sensors on the probe to an external operational system. Additionally, in some embodiments, a resolver 136 can be included to track or determine the radial position of the sensing arms 116 relative to the stabilization legs 112. The resolver 136 generates a signal indicative of the radial position or the radial coordinates of one or both of the sensing arms 116 and the stabilization legs 112, or the second segment 104 or first segment 102 to which they are respectively coupled. In the exemplary embodiment of FIG. 2, the resolver 136 is illustrated as being positioned at or near the lower portion of the second segment 104. However, it should be clear to those in the art that the resolver 136 can be positioned at various other positions on the probe 100 and still provide for the determination of the relative radial position. In additional embodiment, the probe 100 can include one or more sensing devices, such as a video sensor or camera (not shown). For example, in some embodiments, a video camera can be positioned on the upper segment 102 to view the lower segment 104, and/or to view the deployment of the stabilizing legs 112 or the sensing arms 116. The video signal can be transmitted back to a supporting system or display screen viewed by an operator to enable monitoring of one or more operations of the sensing arms, such as their rotation. In other embodiments, a video camera can also be positioned to view an area sensed by sensors 117.

Figure 3:
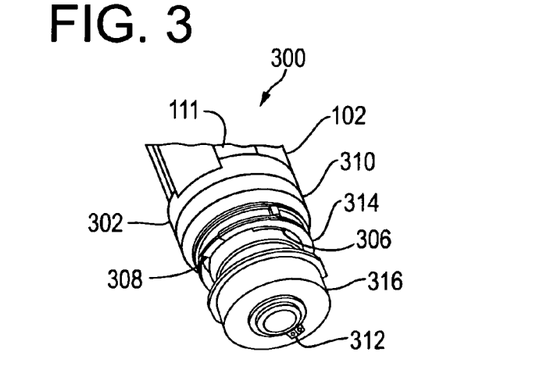
FIG. 3 is a perspective view of a spindle assembly for a bore probe according to one exemplary embodiment of the invention.

Referring now to FIG. 3, a rotary coupler 120 for coupling the first segment 102 and second segment 104 according to one exemplary embodiment is illustrated. In this example, the rotary coupler 120 is shown to be associated with the first segment 102. However, in other embodiments the one or more components of the rotary coupler 120 can be associated with the second segment 104. In the exemplary embodiment of FIG. 3, the first segment 102 is terminated at an end with a spindle plate 302. The motor 111 can be located within the body of the first segment 102 and is operably coupled to a motor drive 304 that extends beyond spindle plate 302. A transfer drive 306 receives rotational energy from the motor drive 304. The spindle plate 302 can also include one or more passageways 308 that can accept one or more operational lines (not shown) that connect between the first segment 102 and the second segment 104.

A spindle axle (not shown) can be positioned over the spindle plate and provides for rotational connectivity between the two segments 102 and 104. In the illustrated embodiment of FIG. 3, the spindle axle 310 also includes a passageway 308 in its base for accepting the one or more operational lines 122. However as the rotary coupler 120 provides for a rotation between the first segment 102 and the second segment 104, the spindle axle 310 includes a center passageway 312 for continued passage of the operational lines 122. In this manner, the operational lines 122 do not become twisted during the rotational operation of the rotary coupler 120. A ring gear 314 is driven by transfer drive 306 to drive the rotation of the second segment 104. A bearing 316 can be included to provide for improved rotation of the rotary coupler 120. A spindle coupler (not shown) can be placed over the other components of the rotary coupler 120. The spindle coupler can include on its inner surface (not shown) a gear mating mechanism for receiving rotational energy from the ring gear 314. The spindle coupler can include one or more mating features that provide for coupling the rotary coupler 120 to another component, such as the flex coupler 118.

Figure 4:
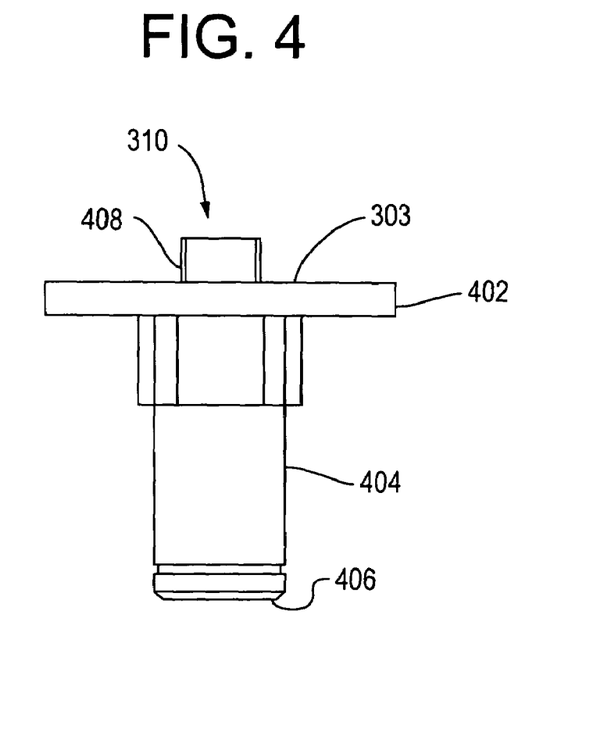
FIG. 4 is a perspective view of a spindle axle for use in a bore probe according to one exemplary embodiment of the invention.

FIG. 4 provides a more detailed perspective view of the spindle axle 310 according to one exemplary embodiment of the invention. As shown, the spindle axle 310 can include a flange 402, a shaft 404, and shaft end 406, and a coupling end 408. Additionally, the flange 402 can include one or more fasteners or fastening means, such as, by way of example, mounting holes.

Figure 5:
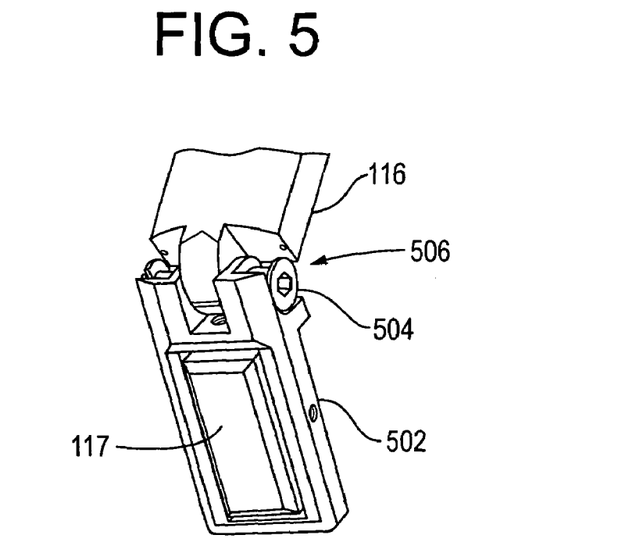
FIG. 5 is a perspective view of a sensor arm having a biased and gimbaled sensor tip for use in a bore according to one exemplary embodiment of the invention.

As noted above, one or more sensor arms 116 can be configured to include one or more sensors 117. FIG. 5 illustrates one exemplary embodiment of a sensing end or tip of a sensor arm 116. In this example, the sensor arm 116 includes a gimbaled end 502 that is attached to the sensor arm 116 with a hinge 504 or similar flexible device. A sensor 117 is attached to the gimbaled end 502 and positioned for optimal sensing of a characteristic of the bore to be inspected. Additionally, a spring 506 (not shown in FIG. 5) can provide a bias to the gimbaled end 502 such that the gimbaled end 502 is normally positioned in the same plane as the sensor arm 116. In this manner, the gimbaled end 502 is positioned to be enclosed with the body of the second segment 104 when the sensor arm 116 is collapsed into arm cavity 114. However, when the sensor arms 116 are extended and come into contact with an inner surface of the bore, the gimbaled end 502 rotates about hinge 504 so that sensor 117 becomes optimally aligned with the plane of the bores' inner surface.

Figure 6:
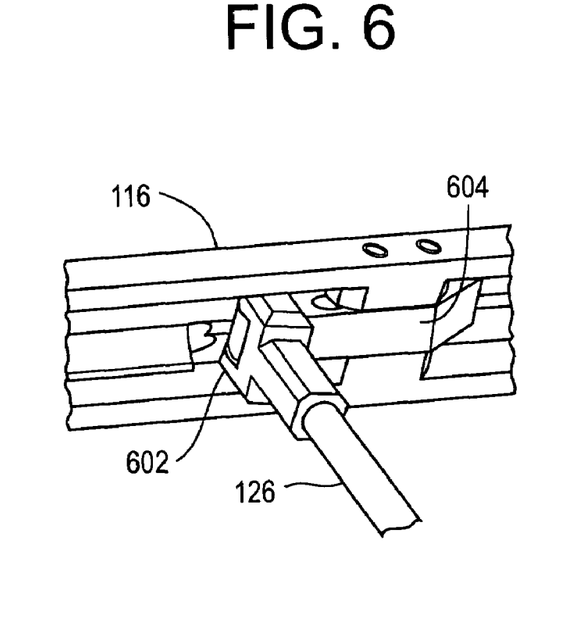
FIG. 6 is a side view of sensor arm coupling to a sensor arm actuator and includes a passive biasing element according to one exemplary embodiment of the invention.
Figure 7:
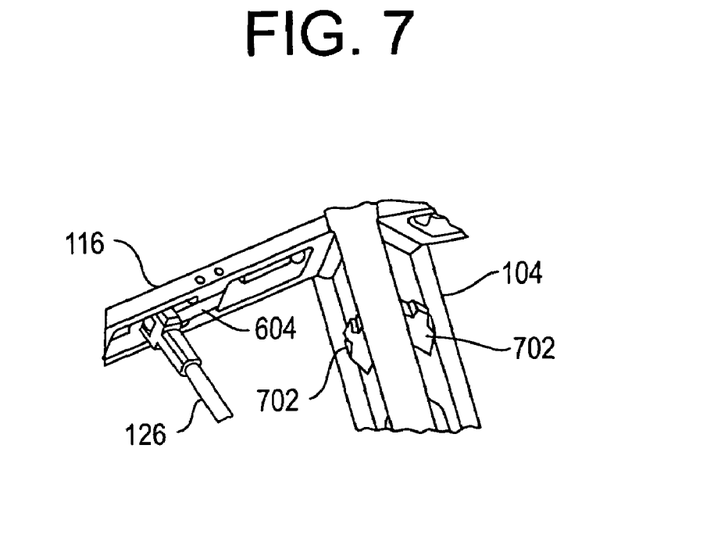
FIG. 7 is a side view of a sensor segment with an extended sensor arm, each having a passive biasing element according to another exemplary embodiment of the invention.

Referring now to FIG. 6, a sensor arm 116 is coupled to the arm actuator 126 via a hinge 602 or similar flexible joint. In some embodiments, each sensor arm 116 can also include a passive biasing element 604. The passive biasing element 604 can include, by way of example, a wedge, ramp, or curved surface. The passive biasing element 604 of the sensor arm 116 can operate in conjunction with one or more features of the body of the second segment 104 to provide for an initial outward biasing of the sensor arms 116 when the sensor arm actuator 126 begins to move from the collapsed position to the extended position. As shown in FIG. 7, a second passive biasing element 702 can also be a wedge, ramp, curved surface, flange, which when placed in contact with an upward movement passive biasing element 604, provides an outward pressure to sensor arm 116 to urge, at least a portion, of sensor arm to extend radially from arm cavity 114. In one embodiment, both passive biasing elements 604 and 702 are wedges. As the sensor arms 116 extend radially, the arm actuators 126 rotate outward and provide the required radial extension to the sensor arms 116. As shown in FIG. 7, a second end 802 of each arm actuators 126 is coupled to the body of the second segment 104 by a hinge, shaft, or similar flexible or rotational element. As noted above, each arm actuator 126 can be any type of actuator including a hydraulic cylinder, a motor and worm gear arrangement, or similar actuating assembly.

Figure 8:
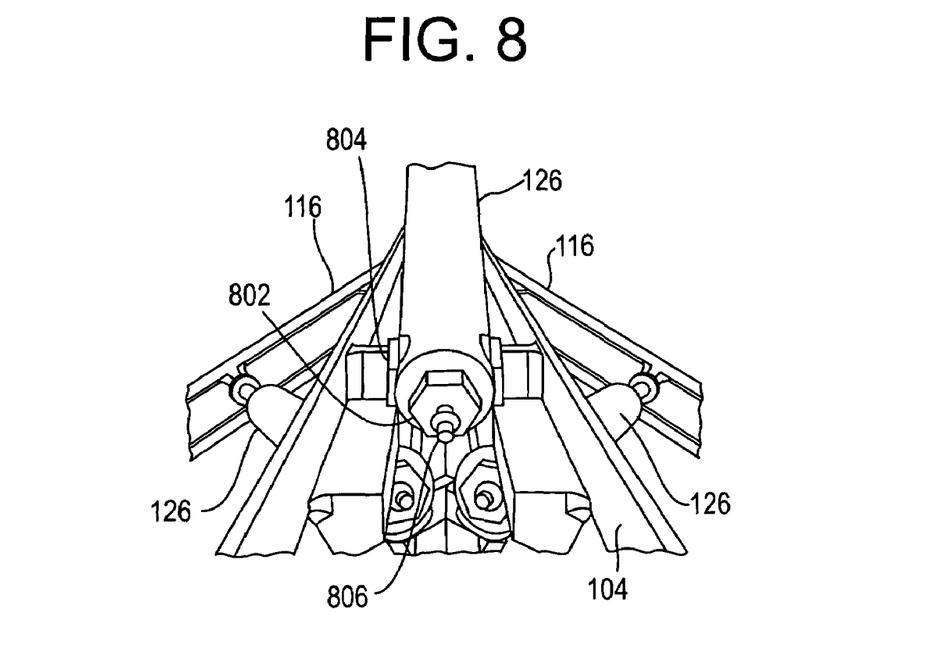
FIG. 8 is a view of a sensor segment having three sensor arms and three air cylinder sensor arm actuators according to one embodiment of the invention.
Figure 9:
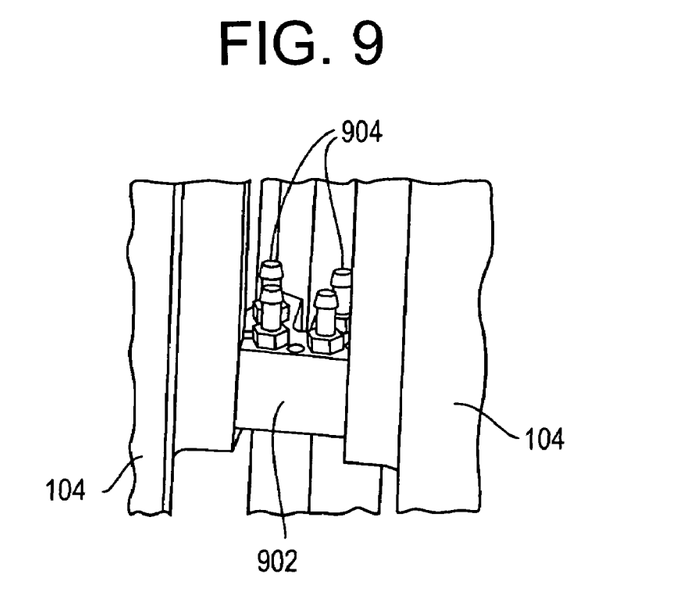
FIG. 9 is a view of an air manifold for coordinating the actuation of three air cylinder sensor arm actuators according to another embodiment of the invention.

Also as shown in FIG. 8, each arm actuator 126 is an air cylinder mounted on a rotable coupling 804 and includes an air intake port 806 for operable control of the arm actuator 126. While there may be less than one or more than one arm actuators 126 associated with each sensor arm 116, in one preferred embodiment there are three sensor arms 116, each with an associated air cylinder arm actuator 126. To enable the equalization of the extension of each sensor arm 116 and the amount of pressure applied by the sensor arm 116 to the inner surface of the bore, a coordinating device, such as an air manifold 902, as shown in FIG. 9 can be provided. The air manifold 902 can have a plurality of air intake ports and output ports 904 to provide coordinated air delivery to the various arm actuators 126. For example, where the probe 100 includes three sensor arms 116 and three arm actuators 126, the air manifold 902 can include a single intake port 904 and three output ports 904. One embodiment of the air manifold 902 would include an internal air chamber (not shown) that receives actuating air from the single intake port 904 and provides an equal distribution to each of the three output ports 904. In this manner, each arm actuator 126 receives a substantially equal amount of actuating air. Additionally, this can reduce the number of operational lines 122 required for extending the sensor arms 116.

The various exemplary embodiments of the inspection probe 100 described herein can provide for improved inspection of an interior bore. The stabilization legs 112 can center and stabilize the probe within the bore thereby providing the sensor arms the ability to be optimally positioned within the bore to perform an inspection or sensing operation. Additionally, the radial stabilization of the first segment 102 of the probe 100 can provide for improved determination and tracking of the rotational position of each sensor 117 within the bore. As such, the sensed characteristics from the sensor 117 can be more accurately associated with a particular circumferential position within the bore, thereby improving the ability of operating personnel in identifying and correcting sensed defects. Some of the improvements and advantages, in addition to others, are provided by the various embodiments of the invention.

When describing elements or features of the present invention or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the invention. Accordingly, all matter contained in the above description or shown in the accompanying drawings should be interpreted as illustrative and not in a limiting sense.

It is further to be understood that the steps described herein are not to be construed as necessarily requiring their performance in the particular order discussed or illustrated. It is also to be understood that additional or alternative steps may be employed.

What is claimed is:

1. A probe for inspecting a bore, comprising:
   a first housing portion dimensioned for insertion into the bore;
   a second housing portion connected to the first housing portion and dimensioned for insertion into the bore;
   a plurality of stabilization legs having a first end attached to the first housing portion and a second end configured to rotate about the first end and away from the first housing portion to contact the inner surface of the bore;
   a plurality of sensor arms configured to rotate away from the second housing portion and rotatable relative to the stabilization legs;
   a motor housed by at least one of the first housing portion and the second housing portion, the motor configured to rotate the sensor arms relative to the stabilization legs; and
   a biasing element configured to retain the stabilization legs within the first housing portion.

2. The probe of claim 1 wherein said sensor arms are coupled to the second housing portion, and wherein said motor is configured to rotate the second housing portion including the sensor arms relative to the first housing portion.

3. The probe of claim 2, further comprising at least one flexible joint coupling the first housing portion and the second housing portion.

4. The probe of claim 2, further comprising a spindle and a gear operable with the motor for rotating the second housing portion relative to the first housing portion.

5. The probe of claim 1 wherein each second end of each stabilization leg includes a friction element for frictionally contacting the inner surface of the bore.

6. The probe of claim 1, further comprising one or more stabilization leg actuators configured for rotating the second end of the stabilization legs from the retained position within the first housing portion to an extended position contacting with the inner surface of the bore.

7. The probe of claim 6 wherein the biasing element is a spring and wherein the one or more stabilization leg actuators is an air cylinder coupled between the first housing portion and each stabilization leg by an activating arm, said spring biasing each stabilization leg to be substantially confined within the first housing portion and each activating arm operable to rotate the second end of each stabilization leg in response to activation of the air cylinder.

8. The probe of claim 1 wherein the first housing portion is a proximal end of the probe and the second housing portion is a distal end of the probe.

9. The probe of claim 1, further comprising one or more sensor arm actuators configured to rotate the sensor arms from a position within the second housing portion to an extended sensing position wherein a sensor end of the sensor arm is positioned proximate to the inner surface of the bore.

10. The probe of claim 9 wherein each sensor arm has an associated sensor arm actuator.

11. The probe of claim 9, further comprising a sensor arm actuation device configured to coordinate the control of the arm sensor actuators.

12. The probe of claim 11 wherein the sensor arm actuation device includes an air manifold and each sensor arm actuator is an air cylinder, said air manifold configured to receive an air input and provide actuating air to each sensor arm air cylinder.

13. The probe of claim 9, further comprising one or more passive biasing elements associated with each sensor arm, said passive biasing elements dimensioned and positioned to assist the rotating of the sensor arms from the position within the second housing portion.

14. The probe of claim 1 wherein each sensor arm includes a sensor configured for sensing a characteristic of the inner surface of the bore.

15. The probe of claim 14 wherein each sensor arm includes a first end attached to the second housing portion and a second end configured to rotate about the first end and away from the housing to contact the inner surface of the bore, and wherein each sensor is attached proximate to the second end.

16. The probe of claim 15 wherein each sensor arm includes a gimbaled portion on the second end biased to be normally positioned along a plane of the sensor arm, and rotatable to a plane of the inner surface of the bore when contacting with the inner surface.

17. The probe of claim 1, further comprising a resolver for providing a signal indicative of the radial position of the sensor arms relative to the stabilization legs.

18. The probe of claim 1 wherein the motor is configured to rotate the sensor arms in a clockwise and counterclockwise direction.

19. The probe of claim 18 wherein the motor is configured to rotate the sensor arms in a clockwise direction for about 360 degrees and then rotate the sensor arms in a counterclockwise direction for about 360 degrees.

20. The probe of claim 1, further comprising a rotational stop for limiting the rotation of the sensor arms relative to the stabilizing legs to one revolution.

21. The probe of claim 1, further comprising a video sensor fixed in relation to the stabilization legs and configured for viewing at least one sensor arm.

22. A probe for inspecting a bore, comprising:
a first housing portion dimensioned for insertion into the bore; a second housing portion dimensioned for insertion into the bore;
at least one flexible joint coupling the first housing portion and the second housing portion;
a spindle for rotatably coupling the first housing portion to the second housing portion;
a plurality of stabilization legs having a first end attached to the first housing portion and a second end configured to rotate about the first end and away from the first housing portion to contact the inner surface of the bore;
a stabilization leg actuator configured for rotating the second end of the stabilization legs from the first housing portion;
a plurality of sensor arms, each of said sensor arms having a first end attached to the second housing portion and a second end configured to rotate about the first end and away from the second housing portion toward the inner surface of the bore and having a sensor;
at least one arm actuator for rotating the second end of each sensor arm from said second housing portion to an extended sensing position;
a motor for rotating the second portion relative to the first portion; and
a biasing element configured to retain the stabilization legs within the first housing portion.

23. The probe of claim 22 wherein each second end of each stabilization leg includes a friction element proximate to the second end for frictionally contacting the inner surface of the bore.

24. The probe of claim 23 wherein said stabilization leg actuator and said at least one sensor arm actuator is one or more air cylinders.

25. The probe of claim 24 wherein there are three sensor arm actuators, further comprising an air manifold for receiving a single air input and providing coordinated air to each of the three sensor arm actuators.

26. The probe of claim 22, further comprising one or more passive biasing elements associated with each sensor arm, said passive biasing elements dimensioned and positioned to assist the rotating of the sensor arms from the second housing portion.

27. The probe of claim 22, further comprising a video sensor coupled to the first housing portion, said video sensor configured for viewing at least one sensor arm.

28. A probe for inspecting an inner surface of a bore, comprising:
a first housing portion dimensioned for insertion into the bore;
a second housing portion dimensioned for insertion into the bore and connected to the first housing portion;
a plurality of stabilization legs having a first end attached to the first housing portion and a second end configured to rotate about the first end and away from the first housing portion to contact the inner surface of the bore;
means housed by at least the first housing portion, the means configured to rotate each of the stabilization legs from a position within the first housing portion to a position having the second end contacting the inner surface of the bore;

a plurality of sensor arms, each of said sensor arms having a first end attached to the second housing portion and a second end configured to rotate about the first end and away from the second housing portion toward the inner surface of the bore and having a sensor;

means housed by at least the second housing portion, the means configured to rotate each of the sensor arms from a position within the second housing portion to a position positioning the sensor proximate to the inner surface of the bore;

means housed by at least one of the first housing portion and the second housing portion, the means configured to rotate the sensor arms relative to the stabilization legs; and means for retaining the stabilization legs within the first housing portion.

29. The probe of claim 28, further comprising a video sensor coupled to the first housing portion, said video sensor configured for viewing at least one sensor arm.

* * * * *